C. N. WHITE.
ELECTROMAGNETIC FISHING TOOL.
APPLICATION FILED DEC. 23, 1912.
1,094,106.
Patented Apr. 21, 1914.
2 SHEETS—SHEET 1.
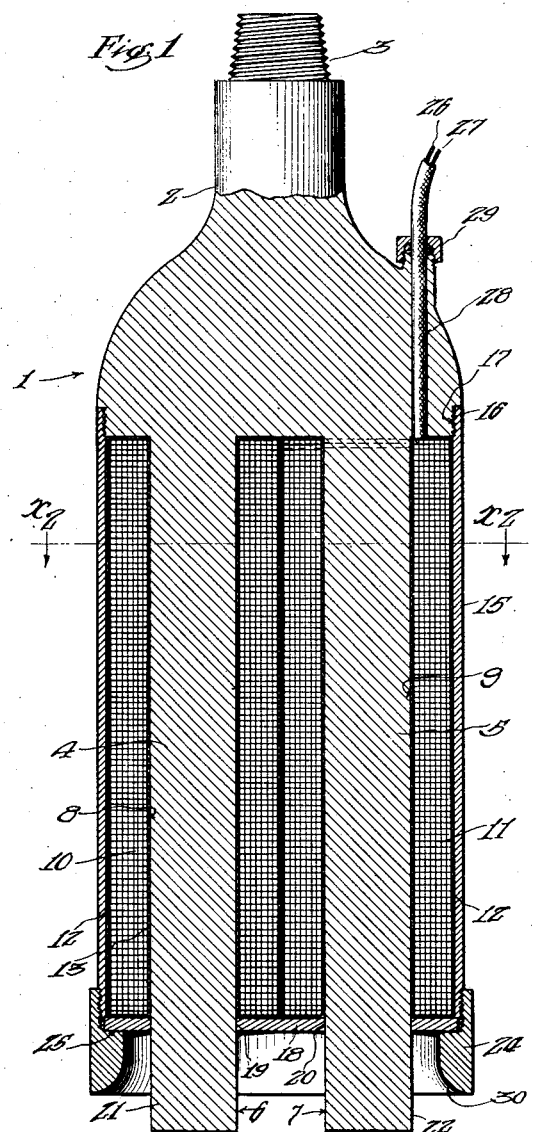
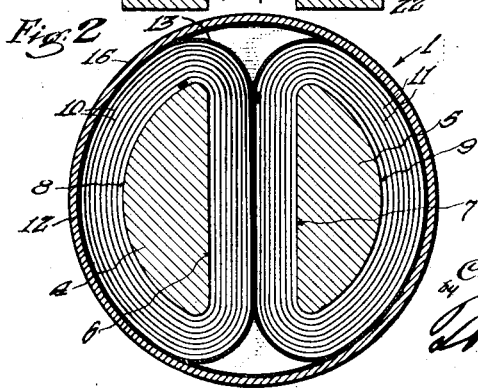
Witnesses:
Inventor:
Calvin N. White;
his attorneys C. N. WHITE.
ELECTROMAGNETIC FISHING TOOL.
APPLICATION FILED DEC. 23, 1912.
1,094,106.
Patented Apr. 21, 1914.
2 SHEETS—SHEET 2.
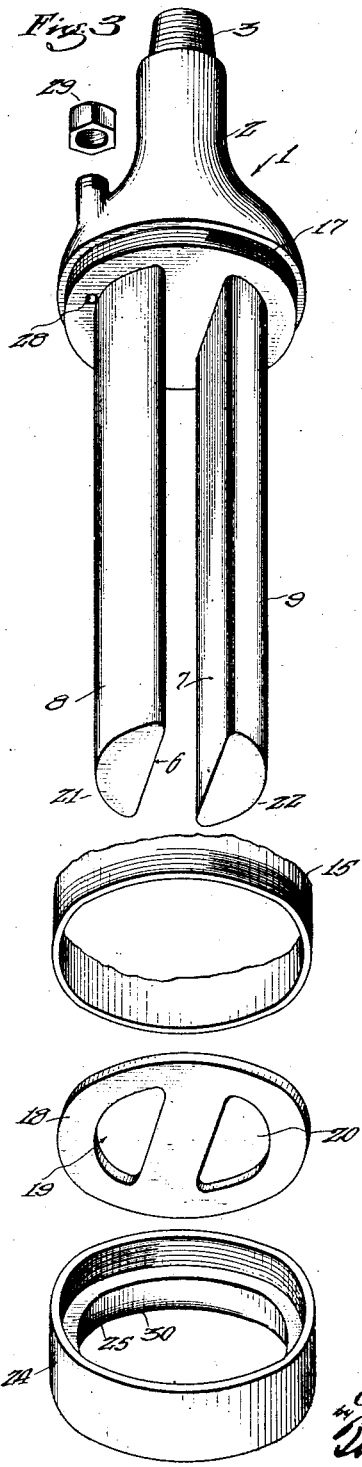
Witnesses:
Inventor,
Calvin N. White;

UNITED STATES PATENT OFFICE.

CALVIN N. WHITE, OF MARICOPA, CALIFORNIA.

ELECTROMAGNETIC FISHING-TOOL.

1,094,106.

Specification of Letters Patent.

Patented Apr. 21, 1914.

Application filed December 23, 1912. Serial No. 738,392.

*To all whom it may concern:*

Be it known that I, CALVIN N. WHITE, a citizen of the United States, residing at Maricopa, in the county of Kern and State of California, have invented a new and useful Electromagnetic Fishing-Tool, of which the following is a specification.

My invention relates to fishing tools, such as are used in wells for the purpose of removing therefrom portions of the drilling tools which have become lost in the well due to breakage of some portion of the string of tools used in the drilling operation of the well. The operation of recovering such lost tools is tedious and costly, due to the fact that the common form of fishing tools used for this purpose depend upon a mechanical manipulation of the portions of the fishing tool which engage the lost tools, and as such mechanical operation takes place at a great distance under the ground, it is a matter of considerable work and skill to manipulate the same with any degree of success.

To overcome the defects of the tools in common use for this purpose, I have devised a fishing tool embodying a form of electric magnet which may be lowered into the well into contact with the lost tools, and the same removed from the well by means of the magnetic attraction of the fishing tool.

Another object of my invention is to produce an electro-magnetic fishing tool of simple form and construction wherein means are provided for protecting the electric winding from damage during the fishing operation.

Referring to the drawings, which are for illustrative purposes only: Figure 1 is a vertical sectional view of a fishing tool embodying a form of my invention. Fig. 2 is a sectional view on line $x^2$—$x^2$ Fig. 1. Fig. 3 is a perspective view showing the component parts of the fishing tool separated, to better illustrate the construction of the same.

The fishing tool comprises a body member 1, preferably composed of soft iron, which body member 1 has a head 2, the upper end of which terminates in a threaded shank 3 which may be secured to the lower end of a series of rods or piping, not shown, such as is commonly used in well construction.

The body member 1 is forged into the form shown, having extending downwardly therefrom two cores 4 and 5, the inner faces 6 and 7 of the cores being flat and the outer faces 8 and 9 of the respective cores being rounded, preferably concentric with the contour of the head 2.

10 and 11 designate windings for the respective cores 4 and 5, which windings are covered by insulating material 12 and 13, the windings 10 and 11 being inclosed by a tubular shell 15, the upper end 16 of which engages a threaded portion 17 of the head 2.

18 designates a flat plate provided with openings 19 and 20 into which openings the lower ends 21 and 22 of the respective cores 4 and 5 extend. The plate 18 is held against the lower end of the windings 10 and 11 by means of a shoe 24 provided with a circular shoulder 25 between which shoulder and the lower end of the tubular shell 15 the plate 18 is tightly clamped, the upper end of the shoe 24 being interiorly threaded to engage the lower threaded end of the tubular shell 15. The tubular shell 15, the plate 18 and the shoe 24 are preferably formed of brass and together form a casing or inclosure for the winding of the respective cores.

26 and 27 designate insulated wires which extend from the windings through a bore 28 upwardly through the head 2, the upper end of which bore 28 is provided with a stuffing box 29. The lower ends 21 and 22 of the respective cores 4 and 5 extend below the lower edge of the shoe 24 a sufficient distance to permit the same to freely come into contact with any object in the well before the shoe contacts with the same.

It is to be noted that the lower inner face of the shoe is rounded, as indicated at 30, to give a greater clearance around the lower end of the cores 4 and 5.

The tool is operated in the following manner: The threaded upper end of the head 2 is secured to the lower end of the string of tools and the fishing tool is lowered into the well until the lower ends 21 and 22 of the respective cores 4 and 5 come in contact with the article sought in the well. A current of electricity is passed through the wires 26 and 27 and through the respective windings 10 and 11 by means of which the cores 4 and 5 become magnetized. The cores 4 and 5 and the head 2 constitute, in general, what is commonly termed a horseshoe magnet, which in the form shown and described is of sufficient power to lift the lost tool out of the well by raising the string of tools and the fishing tool thereon upwardly out of the well. The head 2 being contracted at its upper portion into the shank heretofore referred to permits the placing of the stuffing box 29 within the exterior diameter of the tool in such a position that the wires extending therefrom are prevented from coming into contact with the casing of the well, thereby diminishing the possibility of breakage of the electric connection of the winding.

The tool as heretofore described constitutes in general form an approximately cylindrical body of somewhat smaller diameter than the casing of the well, the cylindrical shape of the tool making it best adapted for operating the same through the casing of the well during the fishing operation.

It is also to be noted that the form of body member with the cores forged and made an integral part thereof, which cores have the particular shape heretofore described, permits the winding of the cores and the inclosure of the same by the tubular shell in such a manner that the result of the said construction is a compact form of tool of few parts of which there is a minimum possibility of damage or breakage.

The openings 19 and 20 through the plate 18 are made so that the fit between the openings between the plates and the cores is tight, and the plate 18 and the tubular shell 15 prevent passage of water or other foreign material from the well to the winding of the cores.

What I claim is:—

1. An electro-magnetic fishing tool comprising a body member, a pair of cores formed on said body member extending downwardly therefrom, a winding on each core, means for insulating said windings, a tubular shell secured to said body member extending downwardly over said windings, a circular plate against the lower end of said tubular shell, said plate having an opening for each core to permit the ends of said cores to extend downwardly therethrough, a circular shoe secured to the lower end of said shell, and a circular shoulder on said shoe adapted to engage said plate and hold the same against the lower end of said shell.

2. An electro-magnetic fishing tool comprising a body member, a pair of cores formed integral with said body extending downwardly therefrom substantially parallel with each other, said cores having flat inner faces and curved outer faces, a winding on each core, insulating means covering each of said windings, a tubular shell threaded to engage the lower portion of said head, a circular plate against the lower end of said shell, said plate having an opening therethrough for each core to permit the ends of the core to extend downwardly therethrough, a circular shoe threaded to the lower end of said shell, and a circular shoulder on said shoe adapted to engage said plate to hold said plate against said shell.

3. An electro-magnetic fishing tool comprising a body member having an opening extending therethrough, a stuffing box at the outer end of said opening, a pair of cores formed integral with said body member extending downwardly therefrom substantially parallel with each other, said cores having flat inner faces and curved outer faces, a winding on each core, wires from said winding extending through said opening in said body and said stuffing box, a tubular shell threaded to engage the lower portion of said head, a circular plate against the lower end of said shell, said plate having an opening therethrough for each core to permit the ends of the core to extend downwardly therethrough, a circular shoe threaded to the lower end of said shell, and a circular shoulder on said shoe adapted to engage said plate to hold said plate against said shell.

In testimony whereof, I have hereunto set my hand at Maricopa, Calif., this 4th day of Dec., 1912.

CALVIN N. WHITE.

In presence of—
  W. T. TAYLOR,
  ROBT. O'ROURKE.